(12) United States Patent
Schrag et al.

(10) Patent No.: US 7,546,212 B2
(45) Date of Patent: Jun. 9, 2009

(54) METHOD AND DEVICE FOR OPERATING A FLOW METER

(75) Inventors: Daniel Schrag, Zurich (CH); Harald Grothey, Goettingen (DE); Kai Hencken, Loerrach (DE); Markus Naegele, Bad Saeckingen (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 11/822,293

(22) Filed: Jul. 3, 2007

(65) Prior Publication Data

US 2008/0016967 A1    Jan. 24, 2008

(30) Foreign Application Priority Data

Jul. 18, 2006   (DE) .................. 10 2006 033 112

(51) Int. Cl.
  *G01F 1/00*  (2006.01)
(52) U.S. Cl. ...................... 702/45; 73/861.12
(58) Field of Classification Search .......... 702/45, 702/47, 65, 150, 183, 189; 73/861.12, 861.17
  See application file for complete search history.

(56) References Cited

U.S. PATENT DOCUMENTS

| | | | |
|---|---|---|---|
| 4,969,363 A | | 11/1990 | Mochizuki |
| 5,426,984 A | * | 6/1995 | Rovner et al. ............ 73/861.17 |
| 6,460,565 B1 | * | 10/2002 | Titus .......................... 137/487 |
| 6,804,613 B2 | | 10/2004 | Ishikawa et al. |
| 7,155,983 B2 | * | 1/2007 | Wehrs et al. ............. 73/861.12 |
| 2003/0051557 A1 | | 3/2003 | Ishikawa et al. |
| 2007/0185667 A1 | * | 8/2007 | Asquith ...................... 702/65 |

FOREIGN PATENT DOCUMENTS

| | | |
|---|---|---|
| DE | 101 18 002 B4 | 10/2002 |
| DE | 102 43 748 A1 | 4/2003 |
| EP | 0 878 694 (A1) | 11/1998 |
| EP | 1 042 651 (B1) | 10/2000 |
| JP | 3-135730 (A) | 6/1991 |

* cited by examiner

*Primary Examiner*—Bryan Bui
(74) *Attorney, Agent, or Firm*—Buchanan Ingersoll & Rooney PC

(57) ABSTRACT

Systems and methods are directed to method and device operating a flow meter. The flow meter including electrodes which can be used to feed a signal into fluid to be measured. A signal $E_{1i}$ in the form of a current or a voltage is applied to at least one first electrode. A response signal is measured at another electrode $E_{2i}$ which does not receive the signal or is not currently activated, to record a diagnosis the flow meter and the changes in the consistency of the flowing medium at any time during measurement operation. Impedances are determined and/or voltage(s) and/or current(s) are measured, wherein these values are set in comparison/ratio with previous values and the status of the device and/or of the measurement medium is deduced both qualitatively and quantitatively.

16 Claims, 4 Drawing Sheets

METHOD AND DEVICE FOR OPERATING A FLOW METER

BACKGROUND

1. Field

The invention relates to a method and a device for operating a flow meter, in particular magnetically inductive flow meters but also capacitive meters, as well as those which comprise electrodes which can be used in order to feed a signal into the fluid to be measured, according to the preambles of patent claims 1 and 10.

2. Related Art

The most popular flow meters are ones which are operated magnetically inductively. In this case a magnetic field is induced via a defined measurement tube, and a signal generated by the magnetic field is measured by at least one pair of electrodes, which have a junction with the fluid.

Methods and devices of this type are nowadays often used with diagnostic means for recording the status of the device on the one hand, as well as for recording perturbations in the flow of the measurement medium on the other hand. To this end, the actual measurement signal determining the flow rate is used only secondarily. It is primarily the arrangement of electrodes, which are in contact with the measurement medium, that is used in order to obtain significant measurement values electrically. When feeding signals via the electrodes, limit values are set technically in respect of voltage and current, which reliably prevent electrolysis processes from being induced at the electrodes in the measurement medium.

Besides the functional perturbations of the meter per se, however, otherwise uniform flows of the measurement media may also enter perturbed states, for example owing to the cavity effect in which turbulent flows past tube contours experience such negative pressures that gas bubbles, which then also have to pass through the flow meter device, nevertheless suddenly occur in an otherwise gas bubble-free liquid medium. Furthermore, other materials such as solids, contaminants or the like in the measurement medium may also cause such perturbations that, although a sum flow rate is in fact thereby measured, similarly as in the case of gas bubbles this does not however correspond exclusively to the flow rate of the actually desired measurement medium. In particular, recording this status proves particularly difficult.

Another problem occurs because in many cases the liquid media generate deposits on the electrodes and/or on the insulating region of the measurement tube, the so-called liner, after a corresponding operating time. These deposits also vitiate the measurement result and therefore the displayed flow rate relative to the true flow rate.

For instance, DE 102 43 748 and DE 101 18 002 disclose an electromagnetic flow meter in which impedances between one or more electrodes and a grounding point are measured. With these, varying resistance values can be compared with empirical values and where applicable deposit formation can be inferred therefrom.

Significant recording of gas bubbles in the flow, for example, is not however provided in this case. Merely growing resistances, particularly at the junction between the electrode and the measurement medium, are diagnosed significantly as deposit-forming.

SUMMARY

It is therefore an object of the invention to refine a method and a device according to the generic type, so that diagnosis both of the device per se and of the changes in the constitution or consistency of the flowing medium can be recorded at any time during measurement operation.

In respect of a method, said object is achieved according to the invention by the features of the main body of patent claim 1.

Further advantageous configurations of the method according to the invention are presented in dependent claims 2 to 9.

In respect of a device according to the generic type, said object is achieved according to the invention by the features of the main body of patent claim 10.

Further configurations according to the invention are specified in the other claims.

The essence of the inventive teaching in respect of the method is that a signal $E_{1i}$ in the form of a current or a voltage is applied to at least one electrode and, at another electrode $E_{2i}$ which does not receive the signal or is not currently activated, impedances are determined and/or voltage(s) and/or current (s) are measured, wherein these values are set in comparison/ratio with previous values and the status/a perturbation of the device and/or of the measurement medium is deduced first qualitatively and then quantitatively therefrom.

Compared with the aforementioned prior art, it is not the impedance between two or more powered electrodes relative to a grounding point that is measured, but instead merely impedances at the electrode(s) which do not receive an imposed measurement signal. This is much simpler and also more significant in result, and therefore better in meaningfulness of the diagnosis, than in the aforementioned prior art. The impedance(s) thereby measured are a quantity affected by noise. The noise, however, lies at a significantly lower level than the impedance value being determined. Studies have revealed in this case that the strength of the noise makes a significant change in its absolute value as soon as gas bubbles form inside the flowing medium. This significant increase in the noise is a reliable quantity, reproducible not only qualitatively but also quantitatively within corresponding limits, for determining the gas bubble flow rate through the flow medium.

In general, a time-varying voltage is fed as a signal to at least one of the electrodes so that, because of the electric field inside the tube, a voltage and/or a current can be measured at a second electrode without having to apply a signal directly to this electrode. Various complex impedances can be determined from the measured values of current and voltage. This determination delivers the essential quantity which is employed for the deposit determination.

According to another advantageous configuration, the corresponding flow rate display is corrected in the event that a perturbation of the flow rate is determined. In the aforementioned way, the perturbation for example due to gas bubbles is in this case corrected by adaptive or extrapolation methods and the corrected display is output on the display with a corresponding correction indication.

According to another advantageous configuration, the detection of a deposit is carried out for example by the determination of rising junction resistances, or else the imaginary part of the impedance which reflects the capacitive component. This shortcoming is not only detected in this case, rather automatic cleaning is optionally initiated. To this end, a high-voltage or heavy-current signal is delivered to the electrodes in order to clean them.

According to another advantageous configuration, switching may be carried out between measurement and diagnostic cycles.

According to another advantageous configuration, the measurement and diagnostic cycles also temporally overlap and are therefore measured simultaneously with different frequencies, so there the measurement cycle and diagnostic cycle do not perturb each other i.e. their signals would perturbingly interfere.

Furthermore, provision is made to determine the conductivity of the medium via a current-voltage measurement and ascertaining an impedance. A further quantity for the complex diagnosis is thereby provided.

Another diagnostic possibility consists in determining the correct installation position of the flow meter in the pipeline. In the event of an incorrect installation position, a warning or message signal is automatically generated. This diagnosis is carried out by determining an asymmetry in the voltage or current measurement or an impedance ascertained therefrom. Another possibility consists in determining increased noise.

Lastly, in a flow meter for carrying out the method according to the invention, electronic means are provided by which a signal $E_{1i}$ can be applied to at least one electrode and, at another electrode $E_{2i}$ which does not receive the signal or is not currently activated, the impedance is determined and/or voltage and/or current is measurable or determinable, wherein these values can be set in ratio with previous values in an evaluation unit, and a perturbation in the device and/or in the measurement medium are deduced first qualitatively and then quantitatively therefrom, and this can be displayed in a display.

DESCRIPTION OF THE DRAWING

The invention is represented in the drawings and explained in more detail below. In which.

DETAILED DESCRIPTION

Figure 1:
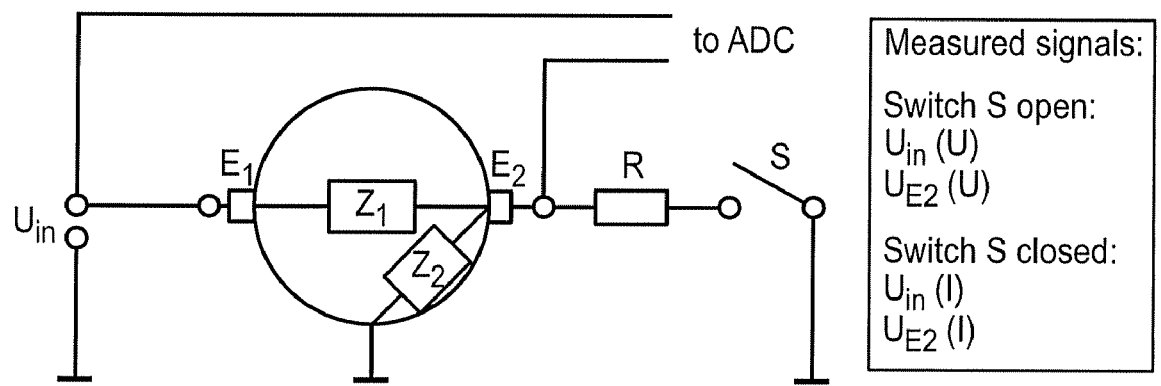
FIG. 1 shows an equivalent circuit diagram of the measurement method according to the invention

FIG. 1 shows the measurement tube of a flow meter, for example of the inductive or capacitive type, merely schematically and in cross section. Inside the measurement tube, the flowing measurement medium is contacted by electrodes $E_1$ and $E_2$ routed from the outside and DC or capacitively coupled to the measurement medium. $E_1$ and $E_2$ are the electrodes, $E_1$ being the electrode on which the actual initiation signal is imposed, for example as an AC signal. $E_2$, however, measures merely the response signal.

The external interconnection is also schematically represented. Furthermore, a possible equivalent circuit diagram for the impedances existing between the electrodes among themselves and the electrodes and chassis or ground is represented inside the measurement tube.

EXEMPLARY EMBODIMENT

The resistor R is connected in front of the electrode $E_2$. With the switch S closed, the real ohmic impedance R is therefore grounded in parallel with the impedance $Z_2$. Measurements are taken once with the switch open and once with the switch closed, specifically the voltage at $E_1$ as a function of the current and the voltage at $E_2$ as a function of the current.

The following formal relations are obtained for the two switching states switch S open and switch S closed:

$$S: \text{closed } Z_1 = \frac{U_{in}(I) - U_{E2}(I)}{I_{E2}(I)} \text{ with } I_{E2}(I) = \frac{U_{E2}(I)}{R}$$

$$S: \text{open } Z_2 = \frac{Z_1 \cdot U_{E2}(U)}{U_{in}(U) - U_{E2}(U)}$$

All signals are processed with amplitude and phase information ($\Rightarrow$ complex notation in the aforementioned formulae)

The signal evaluation is substantially different to that which has been carried out in known measuring instruments. The impedance determined in this way also does not correspond to the impedance which is measured in the known measuring instrument, since here the impedance of a part of the system is represented by the equivalent circuit diagram.

Figure 2:
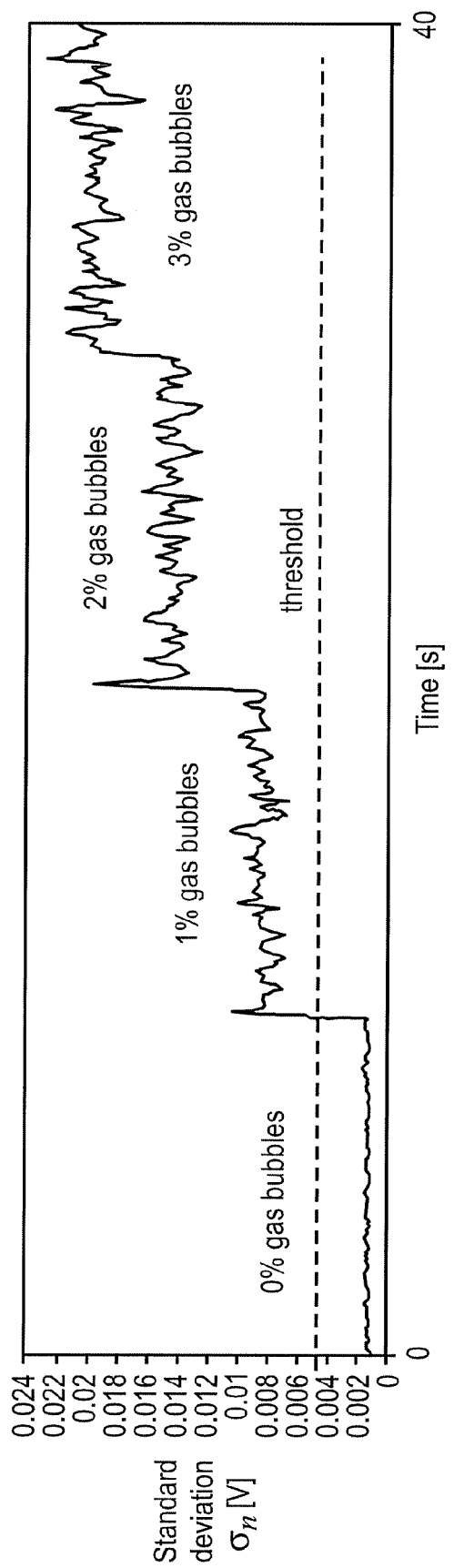
FIG. 2 shows gas bubble detection

FIG. 2 describes essentially the measurement mode for the detection of gas bubbles in the flowing medium, which per se do generate a measurement error when not taken into account.

The electric field, or a voltage induced on the electrode $E_2$, is in this case measured as a function of time. The signal is fed to the electrode $E_1$, usually an AC signal with a frequency of 2 kHz, at 0.1 V. The output signal or response signal is then measured at $E_2$. As a formal relation, the standard deviation $\sigma_n$ of the signal $E_2$ (for example of the amplitude A) and its evaluation according to formula:

$$\sigma_n = \sqrt{\frac{1}{(n-1)}\sum_{i=1}^{n}(A_i - \overline{A})^2} \quad (n > 1)$$

are used.

The lower image part of FIG. 2 illustrates a measurement waveform in which the standard deviation, i.e. the already cleaned noise, is represented as a function of time. Around a mean value with 0% gas bubbles in the measurement medium, the standard deviation $\sigma_n$ is close to 0. With a gas bubble proportion of 1%, $\sigma$ already rises significantly to a second plateau above the average value, and likewise with 2% gas bubbles in the measurement medium and so on. This means that this method is very well-suited for the detection of gas bubbles and is moreover very highly reproducible. Even a quantitative inference is possible.

Figure 3:
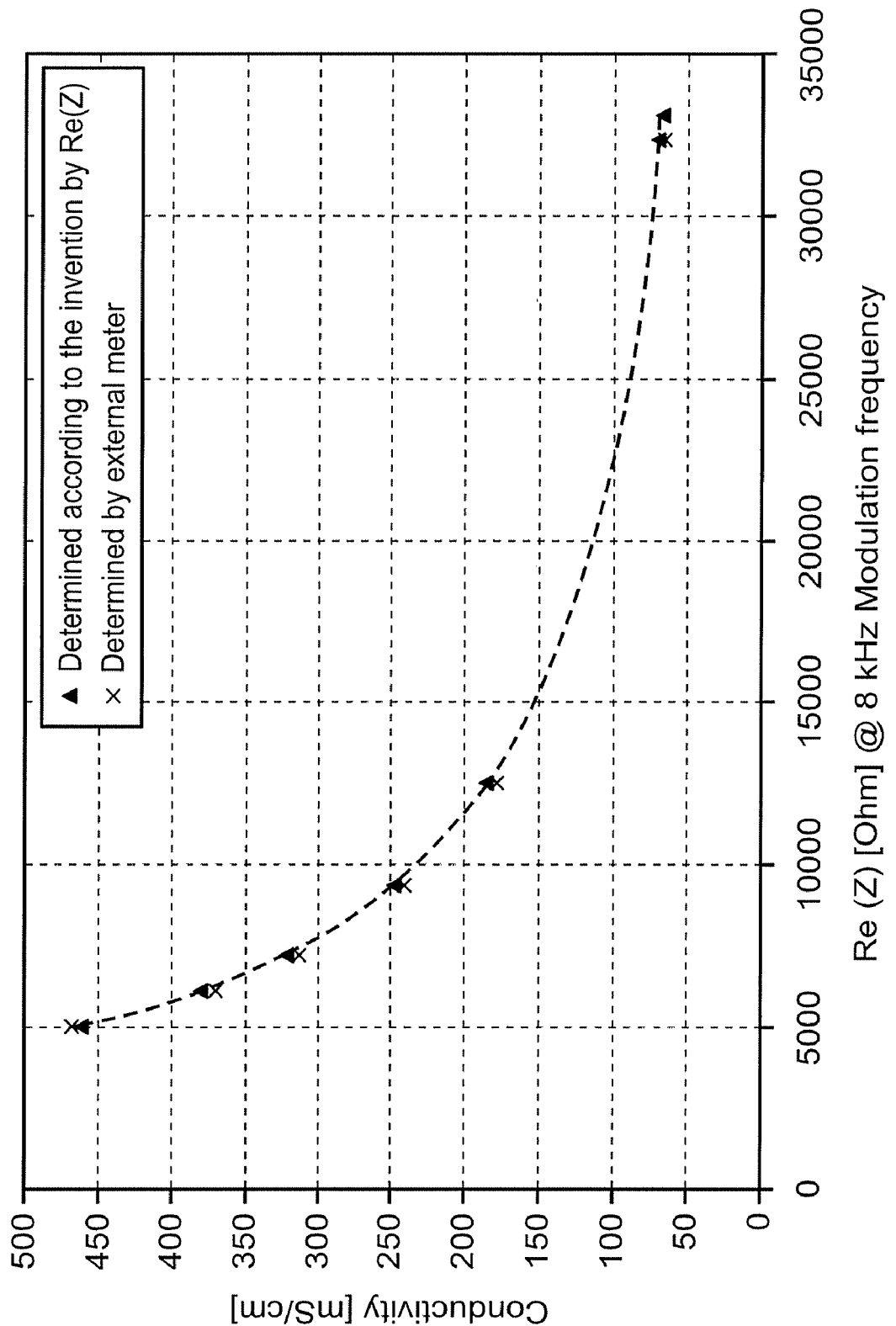
FIG. 3 shows conductivity measurement

Moreover, the determination of the conductivity $\sigma_L$ in the measurement medium furthermore plays a role in respect of FIG. 3. FIG. 3 shows the conductivity plotted as a function of the resistance. The crosses above the measurement diagram stand for the measured values and the conductivity determined from the formal relation. The triangles are the results of the reference measurement of the conductivity with a meter. An excellent match of the two conductivities is obtained in this case.

The formal relation used for this is $$\sigma_L = \frac{k}{\text{Re}(Z)}$$

Here, k is a geometrical constant. Re(Z) denotes the real part of the impedance Z.

Figure 4:
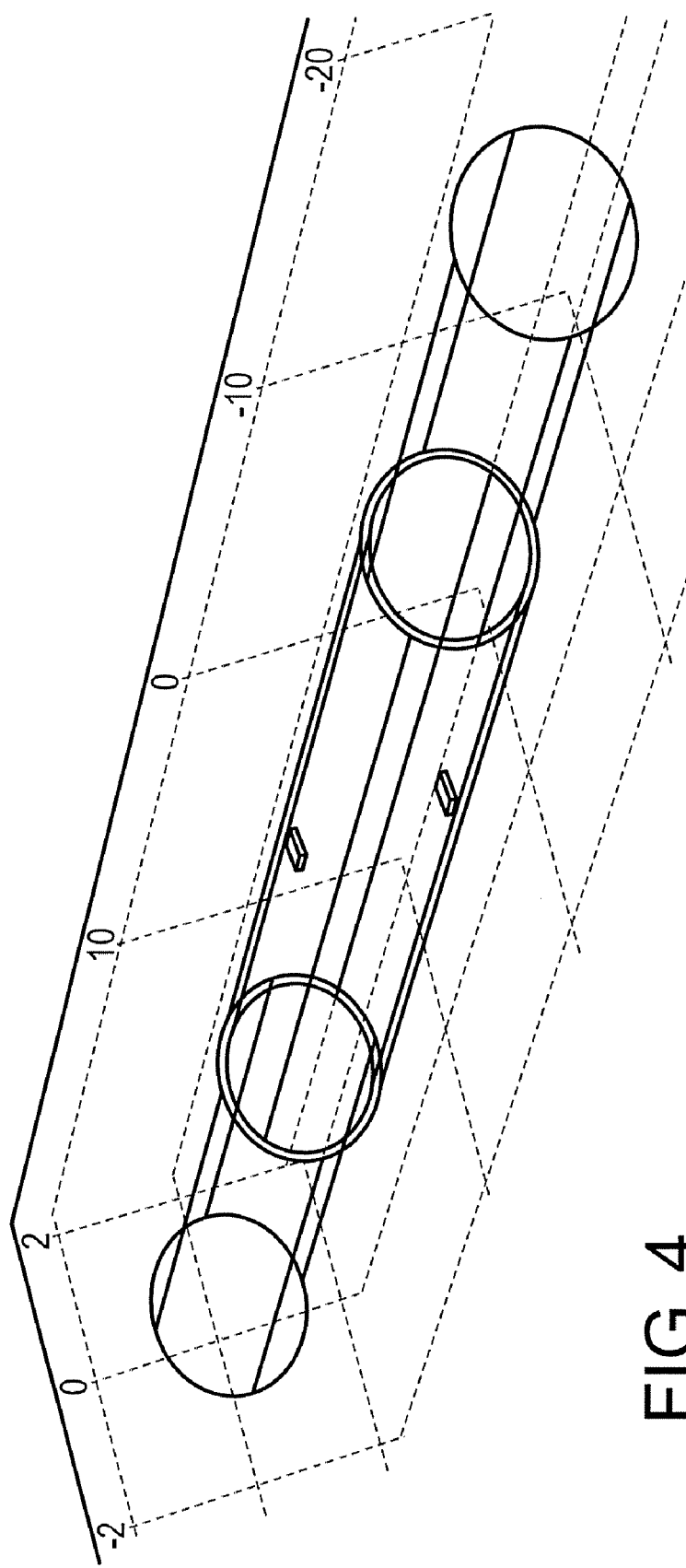
FIG. 4 shows a schematic measurement tube representation in 3D view.

FIG. 4 shows again in a very simplified representation a corresponding measurement tube in longitudinal representation, the electrodes $E_1$ and $E_2$ here being placed opposite in the measurement tube wall. These may however be continued in sequence, and optionally also be arranged distributed pairwise along the measurement tube length direction. This gives a three-dimensional measurement field, so that the mass and volume flow rates can also thereby be determined as accurately as possible.

In respect of the undesired covering of the electrodes with adsorbates from the liquid, this is determined by evaluating the imaginary part of the aforementioned impedances and displayed as a measurement series, or the values are stored in an adaptive memory array (not further represented here). Drifts in the impedance values can then be identified, so that deposit formation can in turn be deduced. By ultrasound or electromagnetically fed short-term signals on the electrodes, these can then be freed from the deposit again. In this case, however, it is necessary that the deposits can already be registered very early, that is to say in very thin layers.

For this evaluation, the effect that a deposit formation leads to a very pronounced change of the boundary layer between the electrode and the fluid is physically employed. It is visible as a strong capacitance change, which is visible in the imaginary part of the impedance. This is utilized here.

It should furthermore be mentioned that this method may be employed both for magnetically inductive flow meters and for capacitive flow meters, and all those via which a signal can be fed into the measurement medium by means of electrodes.

The invention claimed is:

1. A method for operating a flow meter, the method comprising:
    applying a first input signal in the form of a current or a voltage to a first electrode of the flow meter;
    measuring a response signal at second electrode of the flow meter at which a second input signal is not applied;
    determining impedance values at the second electrode based on the response signal;
    comparing the determined impedance values of the second electrode with previous impedance values of the second electrode stored in an evaluation unit; and
    determining a status of deposit formation in a flowing medium of the flow meter based on a comparison result.

2. The method of claim 1, comprising:
    correcting a corresponding flow rate value when a change in the status of deposit formation is determined.

3. The method of claim 1, wherein a deposit formed on at least one of the first and second electrodes, or an insulating layer is detected from the impedance values.

4. The method of claim 3, comprising:
    delivering an ultrasound signal, an electromagnetic signal, a heavy-current signal, or a high-voltage signal to the first and second electrodes in order to clean the first and second electrodes when a deposit is detected.

5. The method of claim 1, wherein switching is carried out between measuring the response signal and determining the status of deposit formation.

6. The method of claim 1, wherein measuring the response signal and determining the status of deposit formation temporally overlap and are measured simultaneously with different frequencies, so that no interference occurs during the measuring and determining steps.

7. The method of claim 1, comprising:
    determining a conductivity of the medium based on a current-voltage measurement of at least one of the second electrodes.

8. The method of claim 1, wherein a partial filling of the medium with gas bubbles or solids is determined from a statistical analysis of a temporal noise of the measured response signals or a quantity determined therefrom.

9. The method of claim 1, comprising:
    determining an installation position of the meter based on an asymmetry of a signal when interchanging the functionality of the electrodes or the temporal noise; and
    generating a message signal in the event of an incorrect installation position.

10. The method of claim 1, wherein the status of deposit formation or a change in status of deposit formation can be deduced by forming ratios between particular impedances or forming temporal profiles of deposit formations.

11. The method of claim 1, wherein determining impedance values comprises:
    measuring at least one of a voltage and current at the second electrode.

12. A flow meter, in which a signal is fed into a fluid to be measured by at least one first electrode and a measurement signal is tapped at least at one second electrode, the flow meter comprising:
    electronic means for applying a signal to at least one first electrode;
    means for measuring a response signal at a second electrode which does not receive the applied signal,
    means for determining impedance values at the second electrode based on the measured response signal;
    evaluation means for comparing the determined impedance values with previous impedance values stored in an evaluation unit; and
    display means for displaying a perturbation in the fluid determined from a qualitative and quantitative analysis of a comparison result.

13. The flow meter of claim 12, comprising:
    an adaptive memory that stores the determined impedance values together with a respective acquisition time.

14. The flow meter of claim 12, comprising:
    a data link that forwards at least one of the determined status of the deposit formation, a change in status of the deposit formation, and the perturbation to a management system.

15. The flow meter of claim 12, comprising:
    electronic means for comparing impedance values when a functionality of the at least one of the first and second electrodes has changed.

16. The flow meter of claim 12, wherein the means for determining impedance values measures at least one of a voltage and a current at the second electrode.

* * * * *